US012008945B1

(12) United States Patent
Park et al.

(10) Patent No.: US 12,008,945 B1
(45) Date of Patent: Jun. 11, 2024

(54) TILING DISPLAY APPARATUS AND OUTPUT SYNCHRONIZATION METHOD THEREOF

(71) Applicant: LG Display Co., Ltd., Seoul (KR)

(72) Inventors: Sang Woo Park, Paju-si (KR); Tae Gung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/226,546

(22) Filed: Jul. 26, 2023

(30) Foreign Application Priority Data

Dec. 30, 2022 (KR) ........................ 10-2022-0191002

(51) Int. Cl.
*G09G 3/20* (2006.01)
*G09G 3/32* (2016.01)

(52) U.S. Cl.
CPC ............. *G09G 3/2096* (2013.01); *G09G 3/32* (2013.01); *G09G 2300/026* (2013.01); *G09G 2300/0452* (2013.01); *G09G 2310/08* (2013.01); *G09G 2320/0233* (2013.01); *G09G 2320/0242* (2013.01); *G09G 2320/0626* (2013.01); *G09G 2320/0673* (2013.01); *G09G 2360/16* (2013.01)

(58) Field of Classification Search
CPC .. G09G 3/2096; G09G 3/32; G09G 2300/026; G09G 2300/0452; G09G 2310/08; G09G 2320/0233; G09G 2320/0242; G09G 2320/0626; G09G 2320/0673; G09G 2360/16
See application file for complete search history.

(56) References Cited

U.S. PATENT DOCUMENTS

| | | | | |
|---|---|---|---|---|
| 7,019,723 B2 * | 3/2006 | Tsuji | G06F 3/147 | 370/464 |
| 7,138,991 B2 * | 11/2006 | Tsuji | G09G 3/20 | 370/464 |
| 10,067,727 B2 * | 9/2018 | Leeman | G09G 3/006 | |
| 11,036,455 B2 * | 6/2021 | Kim | G06F 3/1446 | |
| 2002/0163513 A1 * | 11/2002 | Tsuji | G09G 3/20 | 345/204 |
| 2005/0179616 A1 * | 8/2005 | Tsuji | G06F 3/147 | 345/2.1 |
| 2009/0096711 A1 * | 4/2009 | Jang | G06F 3/1446 | 345/1.3 |
| 2016/0133216 A1 * | 5/2016 | Song | G09G 3/3677 | 345/87 |
| 2017/0061930 A1 * | 3/2017 | Iuchi | G06F 3/0445 | |
| 2018/0323180 A1 * | 11/2018 | Cok | H01L 23/5386 | |

* cited by examiner

*Primary Examiner* — Michael Pervan
(74) *Attorney, Agent, or Firm* — Fenwick & West LLP

(57) ABSTRACT

A tiling display apparatus comprises: a first display group including first timing controllers to receive a first input data enable signal from a first system chip, the first input data enable signal having a first delay; and a second display group including second timing controllers to receive a second input data enable signal from a second system chip, the second input data enable signal having a second delay, wherein the first timing controllers of the first display group and the second timing controllers of the second display group share input delay information about the first delay of the first input data enable signal and input delay information about the second delay of the second input data enable signal with each other, and each of the first timing controllers and the second timing controllers generate a common output data enable signal based on the shared input delay information.

19 Claims, 12 Drawing Sheets

TILING DISPLAY APPARATUS AND OUTPUT SYNCHRONIZATION METHOD THEREOF

CROSS-REFERENCE TO RELATED APPLICATION

This application claims the benefit of the Republic of Korea Patent Application No. 10-2022-0191002 filed on Dec. 30, 2022, which is hereby incorporated by reference in its entirety.

BACKGROUND

Field of Technology

The present disclosure relates to a tiling display apparatus capable of expanding a number of display modules included in the tiling display apparatus.

Discussion of the Related Art

Large-sized displays may be used in various fields such as indoor and outdoor digital advertisements. In order to satisfy the demands for large-sized displays, tiling display apparatuses capable of being expanded have been proposed. In tiling display apparatuses, a tiling screen is configured by connecting a plurality of display modules, and a desired tiling screen size may be implemented by adjusting the number of display modules connected to one another.

To implement a large-sized tiling screen, display modules may be grouped into a plurality of groups, and a system chip may be individually connected thereto for each display group. In this case, tiling display apparatuses include a plurality of display groups and a plurality of system chips connected thereto. Also, each display group includes a plurality of display modules.

Display modules of the same display group may sequentially receive image data input from one system chip, based on a cascading scheme, and due to this, an image output deviation between display modules may occur. The image output deviation may occur between system chips connected to an image source in parallel. When an output deviation occurs between display groups or between display modules of the same display group, an output image of a tiling screen may be distorted.

SUMMARY

To overcome the aforementioned problem of the related art, the present disclosure may provide a tiling display apparatus and an output synchronization method thereof, which may automatically synchronize image output times between all display modules configuring a tiling screen.

In one embodiment, a tiling display apparatus comprises: a first display group including first timing controllers configured to receive a first input data enable signal that is synchronized with a first input image from a first system chip, the first input data enable signal having a first delay; and a second display group including second timing controllers configured to receive a second input data enable signal that is synchronized with a second input image from a second system chip, the second input data enable signal having a second delay that is different from the first delay, wherein the first timing controllers of the first display group and the second timing controllers of the second display group share input delay information about the first delay of the first input data enable signal and input delay information about the second delay of the second input data enable signal with each other, and each of the first timing controllers and the second timing controllers generate a common output data enable signal based on the input delay information about the first delay and the input delay information about the second delay, and wherein an output timing of the first input image to display the first input image matches an output timing of the second input image to display the second input image based on the common output data enable signal generated by each of the first timing controllers and the second timing controllers.

In one embodiment, a tiling display device comprises: a plurality of system chips configured to output a plurality of input data enable signals having different delays, each of the plurality of input data enable signals synchronized with a corresponding portion of an input image; and data enable signal from the plurality of input data enable signals and display a corresponding portion of the input image, each of the plurality of display groups including a plurality of timing controllers that are each configured to: receive delay information indicative of different delays of the plurality of input data enable signals from one or more other timing controllers from the plurality of timing controllers; determine a longest delay of the different delays from the received delay information; and generate a corresponding output data enable signal based on the longest delay, the corresponding output data enable signal indicative of when the display group displays the corresponding portion of the input image, wherein output data enable signals generated by the plurality of timing controllers have a same timing at which each of the plurality of display groups displays the corresponding portion of the image.

In one embodiment, a tiling display device comprises: a plurality of system chips configured to output a plurality of input data enable signals having different delays, each of the plurality of input data enable signals synchronized with a corresponding portion of an input image; a plurality of display groups arranged in a plurality of rows of display groups, each display group including a plurality of timing controllers; a plurality of first interfaces configured to receive the plurality of input data enable signals, each first interface configured to connect together the plurality of timing controllers included in a corresponding display group from the plurality of display groups and connect one timing controller from the plurality of timing controllers included in the corresponding display group to a corresponding one of the plurality of system chips; and a second interface configured to connect together the plurality of timing controllers across all of the plurality of display groups.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
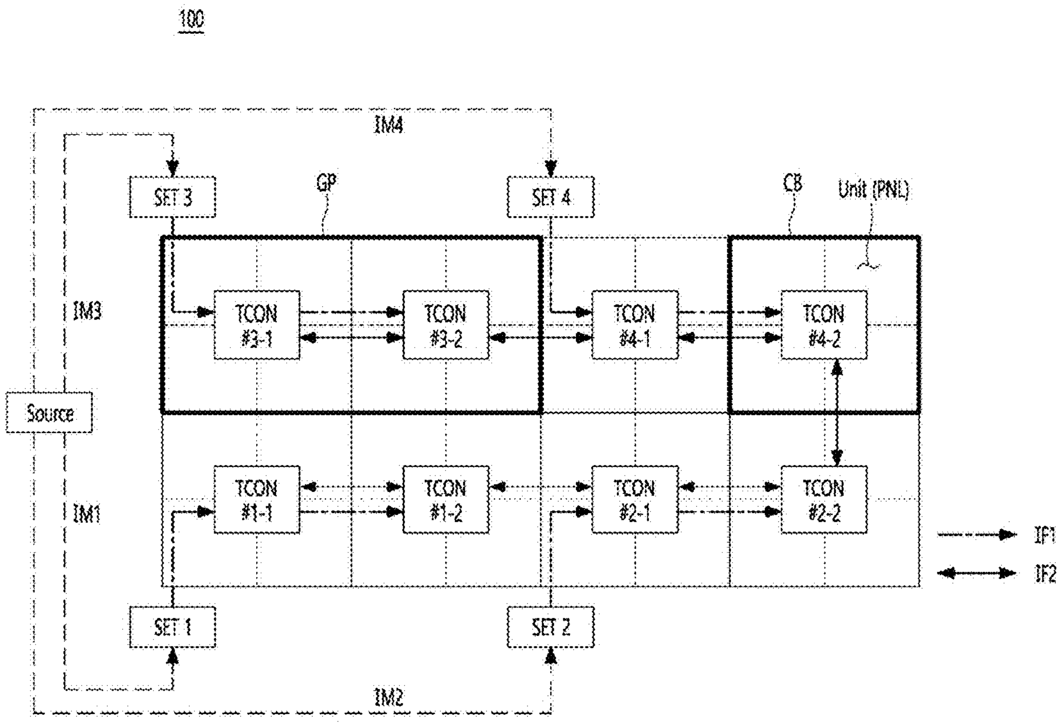
FIG. 1 is a diagram schematically illustrating a tiling display apparatus according to the one embodiment.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on-", "over-", "under-", and "next-", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 2:
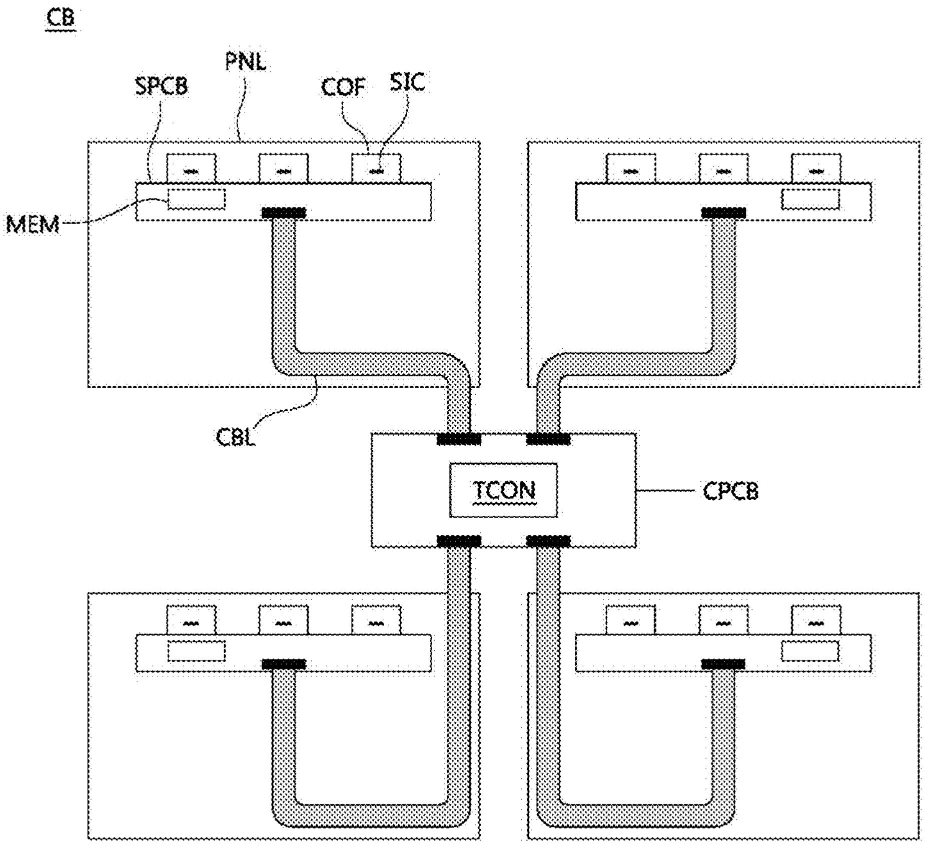
FIG. 2 is a diagram illustrating a connection configuration of a display module according to the one embodiment.

FIG. 1 is a diagram schematically illustrating a tiling display apparatus 100 according to one embodiment. FIG. 2 is a diagram illustrating a connection configuration of a display module according to the one embodiment.

Referring to FIGS. 1 and 2, the tiling display apparatus 100 according to one embodiment may include a plurality of display groups GP and a plurality of system chips SET 1, SET 2, SET 3, and SET 4 that are each respectively connected a corresponding one of the plurality of display groups GP. Also, each display group GP may include a plurality of display modules CB. Also, each display module CB may include a plurality of display panels PNL. The display module CB may be referred to as a cabinet, and the display panel PNL may be referred to as a display unit.

The display group GP may be defined as a set of display modules CB connected with one of the system chips (for example, first to fourth system chips) SET 1, SET 2, SET 3, and SET 4. In the present embodiment, each display group GP may include two display modules CB. Each display group GP may configure a partial tiling screen of a total tiling screen.

The first to fourth system chips SET 1, SET 2, SET 3, and SET 4 may be connected with an image source through different transfer paths in parallel. The first to fourth system chips SET 1, SET 2, SET 3, and SET 4 may be connected with different display groups GP through a first-type interface circuit IF1.

The first system chip SET1 may transfer a first input image IM1 and a first input data enable signal synchronized with the first input image IM1 to a first display group GP through the first-type interface circuit IF1. The second system chip SET2 may transfer a second input image IM2 and a second input data enable signal synchronized with the second input image IM2 to a second display group GP through the first-type interface circuit IF1. The third system chip SET3 may transfer a third input image IM3 and a third input data enable signal synchronized with the third input image IM3 to a third display group GP through the first-type interface circuit IF1. The fourth system chip SET4 may transfer a fourth input image IM4 and a fourth input data enable signal synchronized with the fourth input image IM4 to a fourth display group GP through the first-type interface circuit IF1.

A first tiling screen implemented by the first display group GP may display the first input image IM1. A second tiling screen implemented by the second display group GP may display the second input image IM2. A third tiling screen implemented by the third display group GP may display the third input image IM3. A fourth tiling screen implemented by the fourth display group GP may display the fourth input image IM4. A total number of tiling screens of the tiling display apparatus 100 may be configured by the first to fourth tiling screens where each tiling screen includes a plurality of display panels. A resolution of a total tiling screen may be determined as a total sum of group resolutions based on the first to fourth tiling screens.

The first display group GP may include timing controllers TCON #1-1 and TCON #1-2 of a first group, for individually controlling the plurality of display modules CB included in the first display group GP. The timing controllers TCON #1-1 and TCON #1-2 of the first group may receive a first input data enable signal, synchronized with the first input image IM1, from the first system chip SET1 with different delays. The timing controllers TCON #1-1 and TCON #1-2 of the first group may be connected with each other through the first-type interface circuit IF1 so as to sequentially receive the first input data enable signal synchronized with the first input image IM1. One of the timing controllers TCON #1-1 and TCON #1-2 of the first group may be further connected with the first system chip SET1 through the first-type interface circuit IF1.

The second display group GP may include timing controllers TCON #2-1 and TCON #2-2 of a second group, for individually controlling the plurality of display modules CB included in the second display group GP. The timing controllers TCON #2-1 and TCON #2-2 of the second group may receive a second input data enable signal, synchronized with the second input image IM2, from the second system chip SET2 with different delays. The timing controllers TCON #2-1 and TCON #2-2 of the second group may be connected with each other through the first-type interface circuit IF1 so as to sequentially receive the second input data enable signal synchronized with the second input image IM2. One of the timing controllers TCON #2-1 and TCON #2-2 of the second group may be further connected with the second system chip SET2 through the first-type interface circuit IF1.

The third display group GP may include timing controllers TCON #3-1 and TCON #3-2 of a third group, for individually controlling the plurality of display modules CB included in the third display group GP. The timing controllers TCON #3-1 and TCON #3-2 of the third group may receive a third input data enable signal, synchronized with the third input image IM3, from the third system chip SET3 with different delays. The timing controllers TCON #3-1 and TCON #3-2 of the third group may be connected with each other through the first-type interface circuit IF1 so as to sequentially receive the third input data enable signal synchronized with the third input image IM3. One of the timing controllers TCON #3-1 and TCON #3-2 of the third group may be further connected with the third system chip SET3 through the first-type interface circuit IF1.

The fourth display group GP may include timing controllers TCON #4-1 and TCON #4-2 of a fourth group, for individually controlling the plurality of display modules CB included in the fourth display group GP. The timing controllers TCON #4-1 and TCON #4-2 of the fourth group may receive a fourth input data enable signal, synchronized with the fourth input image IM4, from the fourth system chip SET4 with different delays. The timing controllers TCON #4-1 and TCON #4-2 of the fourth group may be connected with each other through the first-type interface circuit IF1 so as to sequentially receive the fourth input data enable signal synchronized with the fourth input image IM4. One of the timing controllers TCON #4-1 and TCON #4-2 of the fourth group may be further connected with the fourth system chip SET4 through the first-type interface circuit IF1.

The first-type interface circuit IF1 may be implemented based on a V-by-One (V×1) scheme capable of high-speed and large-capacity data interfacing, but is not limited thereto.

The timing controllers TCON #1-1 to TCON #4-2 of the first to fourth groups may share all input delay information about the first to fourth input data enable signals and may individually generate a common output data enable signal.

To this end, the timing controllers TCON #1-1 and TCON #1-2 of the first group may be further connected with each other through a second-type interface circuit IF2, the timing controllers TCON #2-1 and TCON #2-2 of the second group may be further connected with each other through the second-type interface circuit IF2, the timing controllers TCON #3-1 and TCON #3-2 of the third group may be further connected with each other through the second-type interface circuit IF2, and the timing controllers TCON #4-1 and TCON #4-2 of the fourth group may be further connected with each other through the second-type interface circuit IF2. Also, one of the timing controllers TCON #1-1 and TCON #1-2 of the first group may be connected with one of the timing controllers TCON #2-1 and TCON #2-2 of the second group through the second-type interface circuit IF2. One of the timing controllers TCON #3-1 and TCON #3-2 of the third group may be connected with one of the timing controllers TCON #4-1 and TCON #4-2 of the fourth group through the second-type interface circuit IF2. One of the timing controllers TCON #2-1 and TCON #2-2 of the second group may be connected with one of the timing controllers TCON #4-1 and TCON #4-2 of the fourth group through the second-type interface circuit IF2.

The second-type interface circuit IF2 may be implemented as a dual serial peripheral interface (SPI) capable of bidirectional serial communication, but is not limited thereto. Thus, the second-type interface circuit IF2 is a different type of interface than the first-type interface circuit IF1. The second-type interface circuit IF2 is capable of bidirectional serial communication whereas the first-type interface circuit IF1 is capable of unidirectional serial communication.

The timing controllers TCON #1-1 and TCON #1-2 of the first group may synchronize the common output data enable signal with a timing at which the first input image IM1 is output to the first tiling screen of the first display group GP. The timing controllers TCON #2-1 and TCON #2-2 of the second group may synchronize the common output data enable signal with a timing at which the second input image IM2 is output to the second tiling screen of the second display group GP. The timing controllers TCON #3-1 and TCON #3-2 of the third group may synchronize the common output data enable signal with a timing at which the third input image IM3 is output to the third tiling screen of the third display group GP. The timing controllers TCON #4-1 and TCON #4-2 of the fourth group may synchronize the common output data enable signal with a timing at which the fourth input image IM4 is output to the fourth tiling screen of the fourth display group GP. As described above, output timings of the first to fourth input images IM1 to IM4 may match with one another, based on the common output data enable signal.

One display module CB included in each display group GP may include a plurality of display panels PNL, panel driving circuits for driving the display panels PNL, and a timing controller TCON which controls an operation timing of each of the panel driving circuits.

Each of the display panels PNL may be implemented as a micro light emitting diode (LED)-based electroluminescent display type, but is not limited thereto and may be implemented with light emitting devices including a micro-LED.

The timing controller TCON may be mounted on a control printed circuit board (PCB) CPCB and may be connected to the panel driving circuits through a branch cable CBL.

The panel driving circuit may be individually connected to each of the plurality of display panels PNL configuring the same display module CB. The panel driving circuit may include a source PCB SPCB connected to the timing controller TCON through the branch cable CBL, a memory circuit MEM mounted on the source PCB SPCB, a conductive film COF electrically connecting the source PCB SPCB with the display panel PNL, a data driver SIC bonded on the conductive film COF, and a gate driver and a power circuit electrically connected to the source PCB SPCB.

The memory circuit MEM may be a non-volatile memory which stores a panel characteristic and may be flash memory and/or electrically erasable programmable read-only memory (EEPROM), which store(s) a correction value for gamma setting, a first compensation value for compensating for a driving characteristic deviation/color deviation between pixels, a second compensation value for compensating for a boundary deviation between adjacent display panels PNL, various image qualities, and driving control data. In this case, a high amount of data may be stored in flash memory, and a low amount of data may be stored in EEPROM.

The timing controller TCON may operate the panel driving circuit on the basis of a control command signal transferred from a system chip through another interface circuit (not shown) to execute a target operation corresponding to the control command signal and may generate a control response signal including an execution result of the target operation. The target operation may include reset, mute (dark change), gamma change, image quality compensation value update, and firmware update. The target operation may further include an operation of writing and storing control command data in a specific memory and an operation of reading control execution data from a specific memory.

Figure 3:
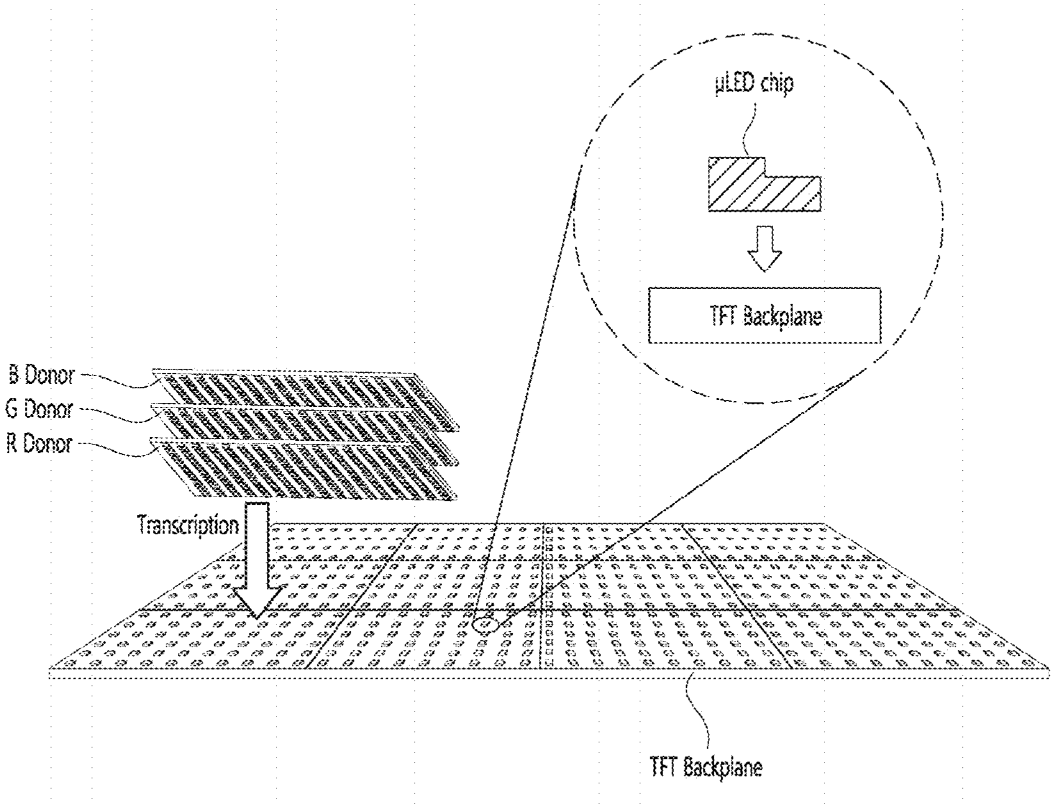
FIGS. 3 and 4 are diagrams illustrating a display panel based on a micro light emitting diode (LED) according to the one embodiment.
Figure 4:
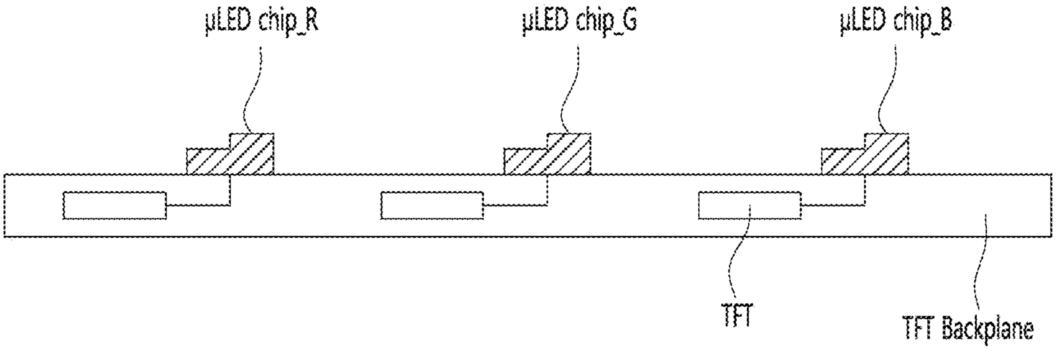

FIGS. 3 and 4 are diagrams illustrating a display panel based on a micro-LED according to one embodiment. Also, FIG. 5 is a schematic equivalent circuit diagram of a pixel included in a display panel according to one embodiment.

Figure 5:
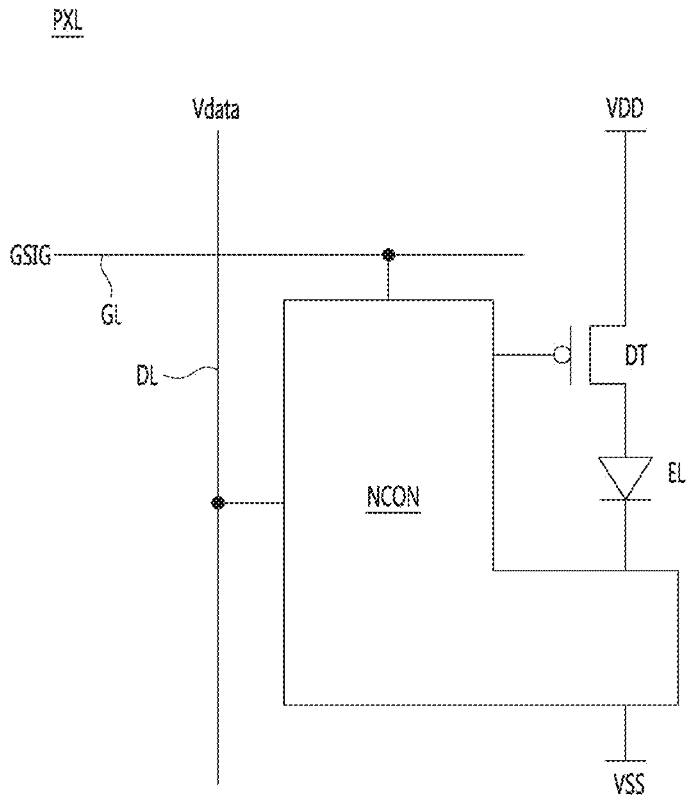
FIG. 5 is a schematic equivalent circuit diagram of a pixel included in a display panel according to the one embodiment.

Referring to FIGS. 3 to 5, a pixel array for displaying an input image may be provided in each of the display panels PNL. A plurality of pixels may be arranged in the pixel array, and signal lines for driving the pixels may be arranged in the pixel array. The signal lines may include a plurality of data lines DL for supplying data voltages Vdata to the pixels, a plurality of gate lines GL for supplying a gate signal GSIG to the pixels, and a plurality of power lines for supplying a source voltage to the pixels.

Each of the pixels may include a micro-LED chip (μLED chip) as a light emitting device EL. A plurality of micro-LED chips (μLED chip) may include red chips (μLED chip_R), green chips (μLED chip_G), and blue chips (μLED chip_B), which are disposed on a thin film transistor (TFT) backplane. A red (R) pixel may include a red chip (μLED chip_R) as a light emitting device EL, a green (G) pixel may include a green chip (μLED chip_G) as a light emitting device EL, and a blue (B) pixel may include a blue chip (μLED chip_B) as a light emitting device EL.

The micro-LED chips (μLED chip) may be transferred from R/G/B donors, and thus, may be mounted on a TFT backplane. The red chips (μLED chip_R) may be transferred from an R donor, the green chips (μLED chip_G) may be transferred from a G donor, and the blue chips (μLED chip_B) may be transferred from a B donor. Transfer technology may use an electrostatic force, a laser, a speed-dependent tacky force, and a load-dependent tacky force. The transfer technology is not limited thereto and may use self-assembly based on an electrostatic force.

The TFT backplane may be implemented in an active matrix structure for efficient driving. In the TFT backplane, the pixels may be defined by the data lines DL, the gate lines GL, and the power lines.

A plurality of pixels may configure one unit pixel. For example, R, G, and B pixels arranged adjacent thereto may configure one unit pixel in an extension direction of the gate line GL or an extension direction of the data line DL.

As shown in FIG. 5, a pixel PXL may include a light emitting device EL, a driving TFT DT, and a node circuit NCON according to one embodiment.

The node circuit NCON may be connected with the gate line GL and the data line DL. The node circuit NCON may include one or more transistors that are supplied with the data voltage Vdata through the data line DL and may be supplied with the gate signal GSIG through the gate line GL. The node circuit NCON may apply the data voltage Vdata to a gate electrode of the driving TFT DT in synchronization with the gate signal GSIG, and thus, may set a gate-source voltage of the driving TFT DT on the basis of a condition for generating a driving current. The node circuit NCON may include an internal compensation circuit which senses and compensates for a threshold voltage and/or electron mobility of the driving TFT DT.

The driving TFT DT may be a driving element which generates the driving current on the basis of the gate-source voltage thereof. The gate electrode of the driving TFT DT may be connected with the node circuit NCON, a first electrode (a drain electrode) thereof may be connected with a high level pixel power VDD, and a second electrode (a source electrode) thereof may be connected with a light emitting device EL.

The light emitting device EL may be a light emitting device which emits light having strength corresponding to the driving current input to the driving TFT DT. The light emitting device EL may be implemented with a micro-LED including an inorganic light emitting layer. A first electrode of the light emitting device EL may be connected with the driving TFT DT, and a second electrode thereof may be connected with a low level pixel power VSS.

A connection configuration and an operation of one pixel PXL may be merely an embodiment, and the spirit of the present disclosure is not limited thereto. For example, each of the driving TFT DT and the node circuit NCON may be implemented based on a PMOS transistor, or may be implemented based on an NMOS transistor. Also, the gate line GL connected to the node circuit NCON may be provided in plurality.

Figure 6:
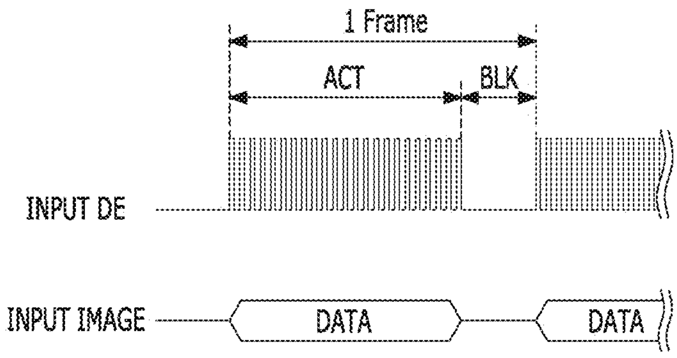
FIG. 6 is a diagram illustrating an example where data of an input image is synchronized with an input data enable signal according to the one embodiment.

FIG. 6 is a diagram illustrating an example where data DATA of an input image is synchronized with an input data enable signal according to one embodiment.

Referring to FIG. 6, one frame may be divided into a vertical active period ACT and a vertical blank period BLK with respect to an input data enable signal DE.

In the vertical active period ACT, the input data enable signal DE may be continuously shifted between a high logic level and a low logic level. On the other hand, in the vertical blank period BLK, the input data enable signal DE may be maintained at only a low logic level without transition. The data DATA of the input image may be transferred between a system chip and a timing controller or timing controllers with being synchronized with the input data enable signal DE. In the vertical blank period BLK, the data DATA of the input image may not be transferred.

Figure 7:
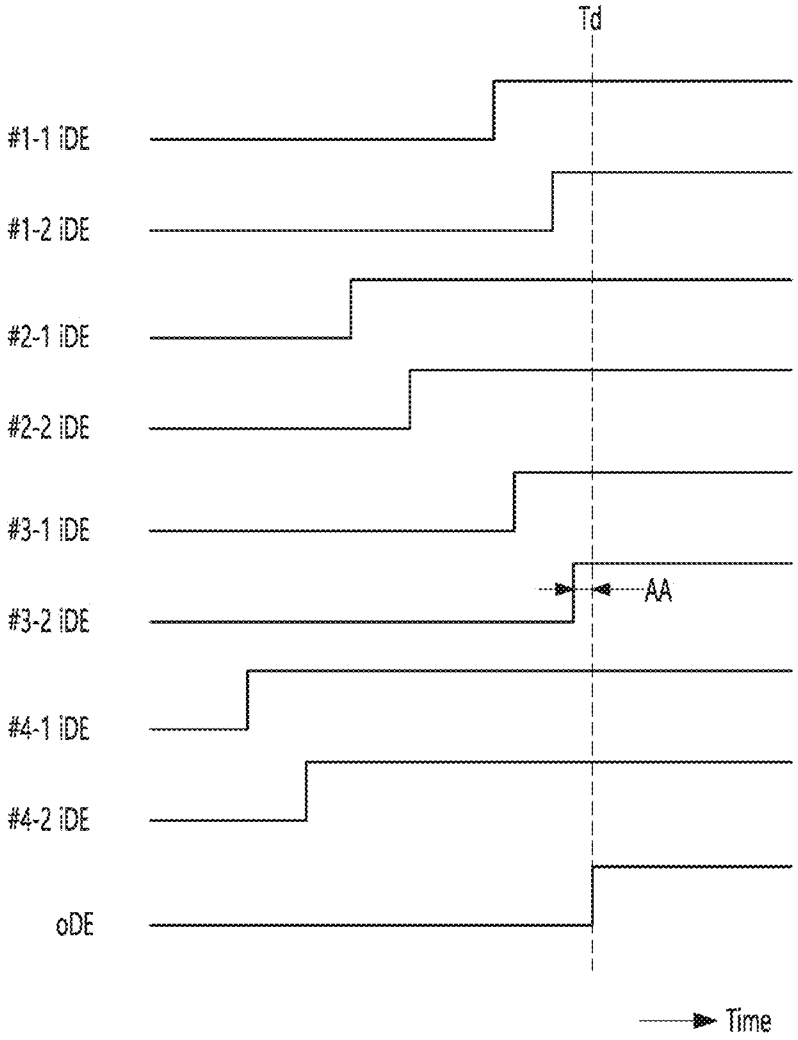
FIG. 7 is a diagram illustrating an input deviation of data enable signals supplied to timing controllers in the tiling display apparatus of FIG. 1 according to the one embodiment.

FIG. 7 is a diagram illustrating an input deviation of data enable signals supplied to the timing controllers TCON #1-1 to TCON #4-2 in the tiling display apparatus 100 of FIG. 1 according to one embodiment.

Referring to FIG. 7, input data enable signals #1-1 iDE to #4-2 iDE supplied to eight timing controllers TCON #1-1 to TCON #4-2 may have various delay deviations.

Two timing controllers included in the same display group may sequentially receive image data input from one system chip, based on a cascading scheme, and due to this, a delay deviation between the timing controllers may occur. Due to a random deviation between system chips, a delay deviation may occur between timing controllers included in different display groups. FIG. 7 is merely an example of various delay deviations, but is not limited thereto. In FIG. 7, high logic periods of the input data enable signals #1-1 iDE to #4-2 iDE may correspond to the vertical active period ACT of FIG. 6. As described above, in the vertical active period ACT, the input data enable signal may be continuously shifted between a high logic level and a low logic level, but in FIG. 7, the vertical active period ACT may be expressed as a high logic period.

Although described below, the timing controllers TCON #1-1 to TCON #4-2 may share pieces of input delay information, based on pieces of average picture level (APL) information transferred and received therebetween, and thus, various delay deviations between the input data enable signals #1-1 iDE to #4-2 iDE may be detected. The timing controllers TCON #1-1 to TCON #4-2 may individually (i.e., each) generate a common output data enable signal oDE with respect to an input data enable signal (for example, #3-2 iDE) where the amount of delay is highest (e.g., longest) amongst the input data enable signals. A timing Td synchronized with the common output data enable signal oDE may be more delayed for a certain time AA than the input data enable signal (for example, #3-2 iDE) where the amount of delay is highest (e.g., longest). This may be based on a logic operation time in a timing controller. When the logic operation time is very short, the timing Td may be ignored.

Figure 8:
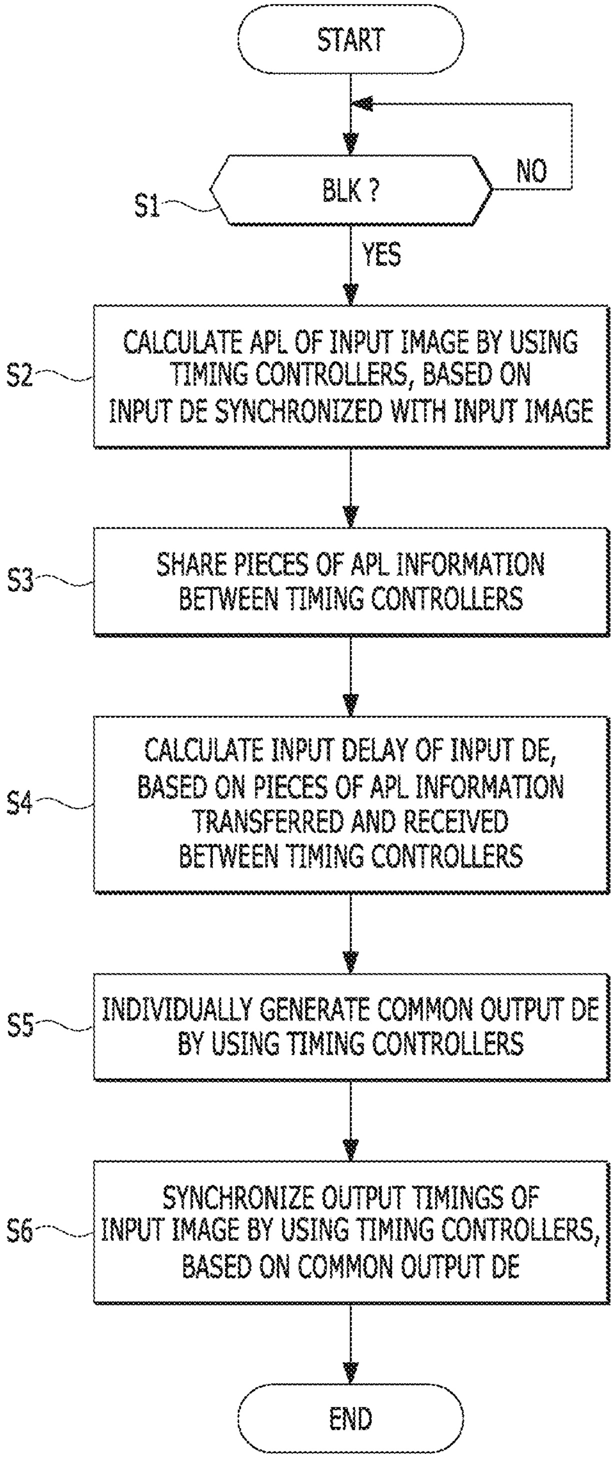
FIG. 8 is a diagram illustrating an output synchronization method of a tiling display apparatus according to the one embodiment.

FIG. 8 is a diagram illustrating an output synchronization method of a tiling display apparatus according to one embodiment.

Referring to FIG. 8, the output synchronization method according to the present embodiment may calculate an average picture level (APL) of an input image in a vertical blank period BLK. In other words, in each of timing controllers TCON, the APL of the input image may be calculated based on an input data enable signal DE synchronized with the input image (S1, S2). In one embodiment, the input image is in a first color space such as the RGB color space. To calculate the APL of the input image, the tiling display apparatus converts the input image in the first color space to a second color space such as the YUV color space. The tiling display apparatus calculates the APL of the input image based on the average of the Y component of the input image in the YUV color space in one embodiment.

The output synchronization method according to the present embodiment may share pieces of APL information between timing controllers TCON (S3). The reason that the pieces of APL information are shared between the timing controllers TCON may be for removing a boundary luminance deviation between display units. A tiling display apparatus according to the present embodiment may control peak luminance by units of display units, based on APL information. In this case, the peak luminance of a target display unit may be controlled with reference to all of APL information about the target display unit and APL information about a display unit adjacent thereto so that a luminance difference does not occur in a boundary portion between display units.

The output synchronization method according to one embodiment may further share pieces of input delay information about data enable signals DE having different delays by using pieces of APL information shared between the timing controllers TCON and may calculate the input delay of the data enable signals DE by using the input delay information (S4).

The output synchronization method according to one embodiment may calculate an input data enable signal where the amount of delay is highest (e.g., longest), with reference to input delay calculated based on pieces of input delay information shared between the timing controllers TCON. Also, the timing controllers TCON may individually (e.g., each) generate a common output data enable signal (output DE) with respect to the input data enable signal where the amount of delay is highest (e.g., longest) (S5).

The output synchronization method according to the present embodiment may synchronize output timings of an input image with respect to the common output data enable signal (output DE) in the timing controllers TCON (S6).

Figure 9:
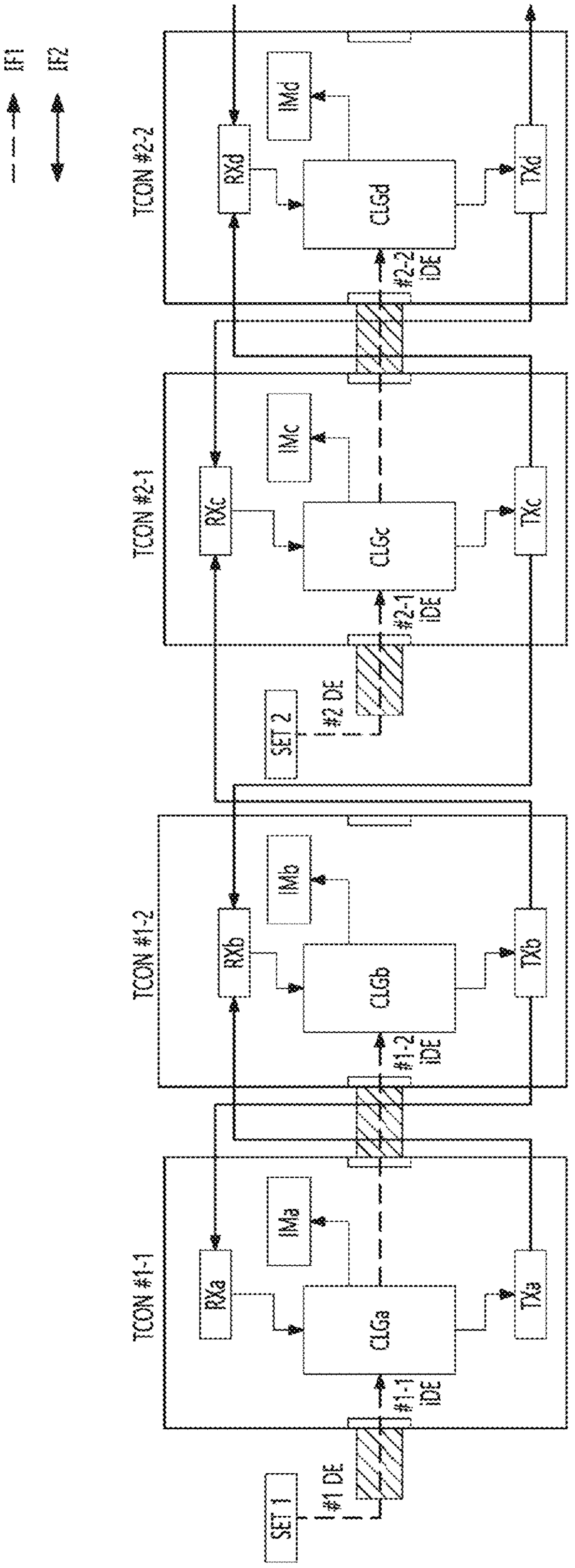
FIG. 9 is a diagram illustrating configurations of timing controllers included in a tiling display apparatus according to the one embodiment.
Figure 10:
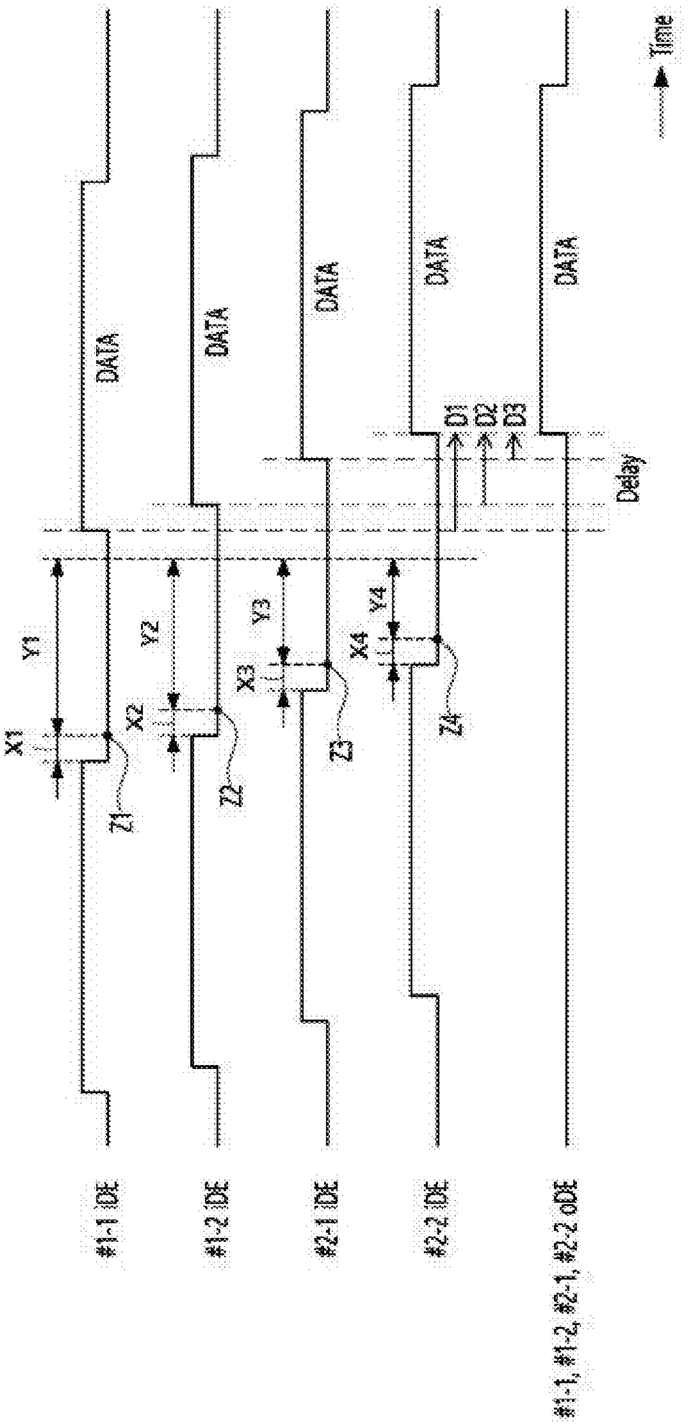
FIG. 10 is a diagram illustrating an example where output data enable signals of timing controllers are synchronized with one another with respect to an input data enable signal where the amount of delay is largest according to the one embodiment.

FIG. 9 is a diagram illustrating configurations of a portion of the timing controllers included in a tiling display apparatus according to one embodiment. FIG. 10 is a diagram illustrating an example where output data enable signals of timing controllers are synchronized with one another with respect to an input data enable signal where the amount of delay is largest.

Referring to FIG. 9, the portion of the timing controllers may be the timing controllers TCON #1-1 and TCON #1-2 of the first group and the timing controllers TCON #2-1 and TCON #2-2 of the second group illustrated in FIG. 1.

The timing controllers TCON #1-1 and TCON #1-2 of the first group may sequentially receive a first input data enable signal #1 DE, synchronized with a first input image IM1, from a first system chip SET1 with different delays. A first logic circuit CLGa of the timing controller TCON #1-1 may receive a 1-1$^{th}$ input data enable signal #1-1 iDE through a first-type interface circuit IF1. A second logic circuit CLGb of the timing controller TCON #1-2 may receive a 1-2$^{th}$ input data enable signal #1-2 iDE through the first-type interface circuit IF1. In a process of transferring a signal from the first logic circuit CLGa to the second logic circuit CLGb, the 1-2$^{th}$ input data enable signal #1-2 iDE may be delayed by a certain time compared to the 1-1$^{th}$ input data enable signal #1-1 iDE.

The timing controllers TCON #2-1 and TCON #2-2 of the second group may sequentially receive a second input data enable signal #2 DE, synchronized with a second input image IM2, from a second system chip SET2 with different delays. A third logic circuit CLGc of the timing controller TCON #2-1 may receive a 2-1$^{th}$ input data enable signal #2-1 iDE through the first-type interface circuit IF1. A fourth logic circuit CLGd of the timing controller TCON #2-2 may receive a 2-2$^{th}$ input data enable signal #2-2 iDE through the first-type interface circuit IF1. In a process of transferring a signal from the third logic circuit CLGc to the fourth logic circuit CLGd, the 2-2$^{th}$ input data enable signal #2-2 iDE may be delayed by a certain time compared to the 2-1$^{th}$ input data enable signal #2-1 iDE.

A transfer path between the first system chip SET1 and the second logic circuit CLGb may differ from a transfer path between the second system chip SET2 and the third logic circuit CLGc, and thus, the 2-1$^{th}$ input data enable signal #2-1 iDE may delayed for a certain compared to the 1-2$^{th}$ input data enable signal #1-2 iDE. However, this may be merely an embodiment. On the other hand, the 1-2$^{th}$ input data enable signal #1-2 iDE may be more delayed by a certain time compared to the 2-1$^{th}$ input data enable signal #2-1 iDE.

The first logic circuit CLGa of the timing controller TCON #1-1 may calculate an APL of a portion of the first input image IM1 (e.g., a first portion) for a predetermined first APL calculation time (X1 of FIG. 10) with respect to the 1-1$^{th}$ input data enable signal #1-1 iDE, and thus, may store #1-1 APL information based thereon in a first memory IMa. A first transfer circuit TXa of the timing controller TCON #1-1 may transfer the #1-1 APL information to a second reception circuit RXb of the timing controller TCON #1-2 through a second-type interface circuit IF2 for a first APL sharing time Y1 succeeding a first APL calculation time X1.

The second logic circuit CLGb of the timing controller TCON #1-2 may calculate an APL of another portion (e.g., a second portion) of the first input image IM1 for a predetermined second APL calculation time (X2 of FIG. 10) with respect to the 1-2$^{th}$ input data enable signal #1-2 iDE, and thus, may store #1-2 APL information based thereon in a second memory IMb. A second transfer circuit TXb of the timing controller TCON #1-2 may transfer the #1-2 APL information to a first reception circuit RXa of the timing controller TCON #1-1 and a third reception circuit RXc of the timing controller TCON #2-1 through the second-type interface circuit IF2 for a second APL sharing time Y2 succeeding a second APL calculation time X2.

The third logic circuit CLGc of the timing controller TCON #2-1 may calculate an APL of a portion of the second input image IM2 (e.g., a first portion) for a predetermined third APL calculation time (X3 of FIG. 10) with respect to the 2-1$^{th}$ input data enable signal #2-1 iDE, and thus, may store #2-1 APL information based thereon in a third memory IMc. A third transfer circuit TXc of the timing controller TCON #2-1 may transfer the #2-1 APL information to a second reception circuit RXb of the timing controller TCON #1-2 and a fourth reception circuit RXd of the timing controller TCON #2-2 through the second-type interface circuit IF2 for a third APL sharing time Y3 succeeding a third APL calculation time X3.

The fourth logic circuit CLGd of the timing controller TCON #2-2 may calculate an APL of another portion of the second input image IM2 (e.g., a second portion) for a predetermined fourth APL calculation time (X4 of FIG. 10) with respect to the 2-2$^{th}$ input data enable signal #2-2 iDE, and thus, may store #2-2 APL information based thereon in a fourth memory IMd. A fourth transfer circuit TXd of the timing controller TCON #2-2 may transfer the #2-2 APL information to the third reception circuit RXc of the timing controller TCON #2-1 and a fifth reception circuit (not shown) of a next timing controller TCON (not shown) through the second-type interface circuit IF2 for a fourth APL sharing time Y4 succeeding a fourth APL calculation time X4.

The first reception circuit RXa of the timing controller TCON #1-1 may sequentially receive all APL information including the #1-2 APL information, the #2-1 APL information, and the #2-2 APL information about the other timing controllers TCON from the second transfer circuit TXb of the timing controller TCON #1-2 through the second-type interface circuit IF2. Whenever APL information about the other timing controller TCON is received, the first logic circuit CLGa may store input delay information, included in the APL information, in the first memory IMa. Pieces of input delay information of the other timing controllers TCON stored in the first memory IMa may be Z2, Z3, Z4, . . . of FIG. 10. The first logic circuit CLGa may compare input delay information Z1 thereof, included in the #1-1 APL information, with the pieces of input delay information Z2, Z3, Z4, . . . of the other timing controllers TCON stored in the first memory IMa to calculate an input data enable signal where the amount of delay D1, D2, and D3 of FIG. 10 is highest (e.g., longest). The first logic circuit CLGa may generate the common output data enable signal oDE with respect to an input data enable signal #2-2 iDE (see FIG. 10) where the amount of delay is highest (e.g., longest).

The second reception circuit RXb of the timing controller TCON #1-2 may receive the #1-1 APL information from the first transfer circuit TXa of the timing controller TCON #1-1 through the second-type interface circuit IF2, and then, may sequentially receive all APL information including the #2-1 APL information and the #2-2 APL information about the other timing controllers TCON from the third transfer circuit TXc of the timing controller TCON #2-1 and may transfer the received APL information to the second logic circuit CLGb.

Whenever APL information about the other timing controller TCON is received, the second logic circuit CLGb may store input delay information, included in the APL information, in the second memory IMb. Pieces of input delay information of the other timing controllers TCON stored in the second memory IMb may be Z1, Z3, Z4, . . . of FIG. 10. The second logic circuit CLGb may compare input delay information Z2 thereof, included in the #1-2 APL information, with the pieces of input delay information Z1, Z3, Z4, . . . of the other timing controllers TCON stored in the second memory IMb to calculate an input data enable signal where the amount of delay D1, D2, and D3 of FIG. 10 is highest (e.g., longest). The second logic circuit CLGb may generate the common output data enable signal oDE with respect to an input data enable signal #2-2 iDE (see FIG. 10) where the amount of delay is highest (e.g., longest).

The third reception circuit RXc of the timing controller TCON #2-1 may sequentially receive the #1-1 APL information and the #1-2 APL information from the second transfer circuit TXb of the timing controller TCON #1-2 through the second-type interface circuit IF2, and then, may sequentially receive all APL information including the #2-2 APL information about the other timing controllers TCON from the fourth transfer circuit TXd of the timing controller TCON #2-2 and may transfer the received APL information to the third logic circuit CLGc. Whenever APL information about the other timing controller TCON is received, the third logic circuit CLGc may store input delay information, included in the APL information, in the third memory IMc. Pieces of input delay information of the other timing controllers TCON stored in the third memory IMc may be Z1, Z2, Z4, . . . of FIG. 10. The third logic circuit CLGc may compare input delay information Z3 thereof, included in the #2-1 APL information, with the pieces of input delay information Z1, Z2, Z4, . . . of the other timing controllers TCON stored in the third memory IMc to calculate an input data enable signal where the amount of delay D1, D2, and D3 of FIG. 10 are highest. The third logic circuit CLGc may generate the common output data enable signal oDE with respect to an input data enable signal #2-2 iDE (see FIG. 10) where the amount of delay is highest (e.g., longest).

The fourth reception circuit RXd of the timing controller TCON #2-2 may sequentially receive the #1-1 APL information, the #1-2 APL information, and the #2-1 APL information from the third transfer circuit TXc of the timing controller TCON #2-1 through the second-type interface circuit IF2, and then, may sequentially receive all APL information about the other timing controllers TCON from a fifth transfer circuit of a next timing controller and may transfer the received APL information to the fourth logic circuit CLGd. Whenever APL information about the other timing controller TCON is received, the fourth logic circuit CLGd may store input delay information, included in the APL information, in the fourth memory IMd. Pieces of input delay information of the other timing controllers TCON stored in the fourth memory IMd may be Z1, Z2, Z3, . . . of FIG. 10. The fourth logic circuit CLGd may compare input delay information Z4 thereof, included in the #2-2 APL information, with the pieces of input delay information Z1, Z2, Z3, . . . of the other timing controllers TCON stored in the fourth memory IMd to calculate an input data enable signal where the amount of delay D1, D2, and D3 of FIG. 10 is highest (e.g., longest). The fourth logic circuit CLGd may generate the common output data enable signal oDE with respect to an input data enable signal #2-2 iDE (see FIG. 10) where the amount of delay is highest (e.g., longest).

To additionally describe FIG. 10, the first to fourth APL calculation times X1 to X4 may be certain times allocated in a vertical blank period and may be equal to one another. First to fourth APL sharing start timings Z1 to Z4 may be arranged immediately after the first to fourth APL calculation times X1 to X4. The starting timings Z1 to Z4 are each indicative of when to start sharing average picture level information. A delay difference between the first to fourth APL sharing start timings Z1 to Z4 may be the same as a delay difference between the input data enable signals #1-1DE to #2-2DE. Therefore, the first to fourth APL sharing start timings Z1 to Z4 may be pieces of input delay information about the input data enable signals #1-1DE to #2-2DE. The timing controllers TCON may transfer and receive APL communication information, and thus, may share all of the APL sharing start timings Z1 to Z4 therebetween. Each of the timing controllers TCON may calculate input delay of input data enable signals, based on the APL sharing start timings Z1 to Z4.

The APL sharing start timings Z1 to Z4 may be allocated in the vertical blank period. When a delay period is large, a time at which APL sharing between timing controllers TCON is completed may be the vertical active period.

An operation of adjusting synchronization of an output data enable signal on the basis of the APL communication information may be performed at every specific period, and the operation may be performed once before a total tiling screen is turned on after a system is powered on.

Figure 11:
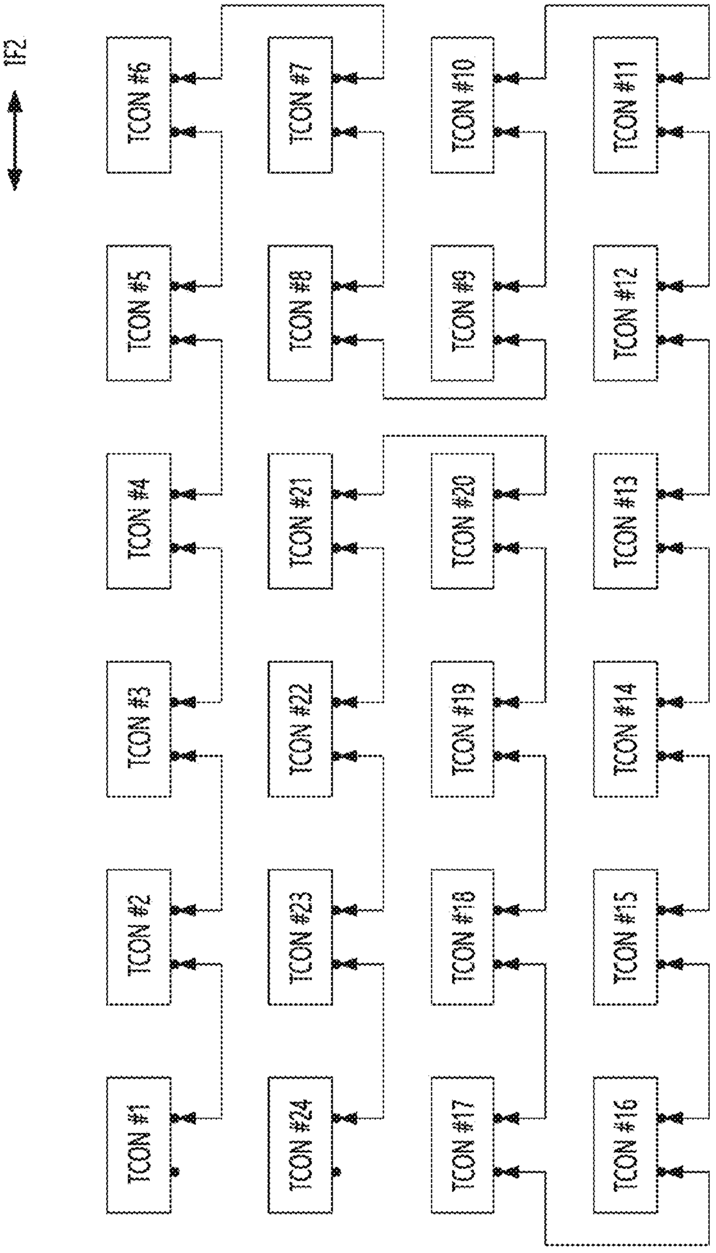
FIG. 11 is a diagram illustrating an interface connection structure between timing controllers for transferring and receiving pieces of average picture level (APL) information according to the one embodiment.
Figure 12:
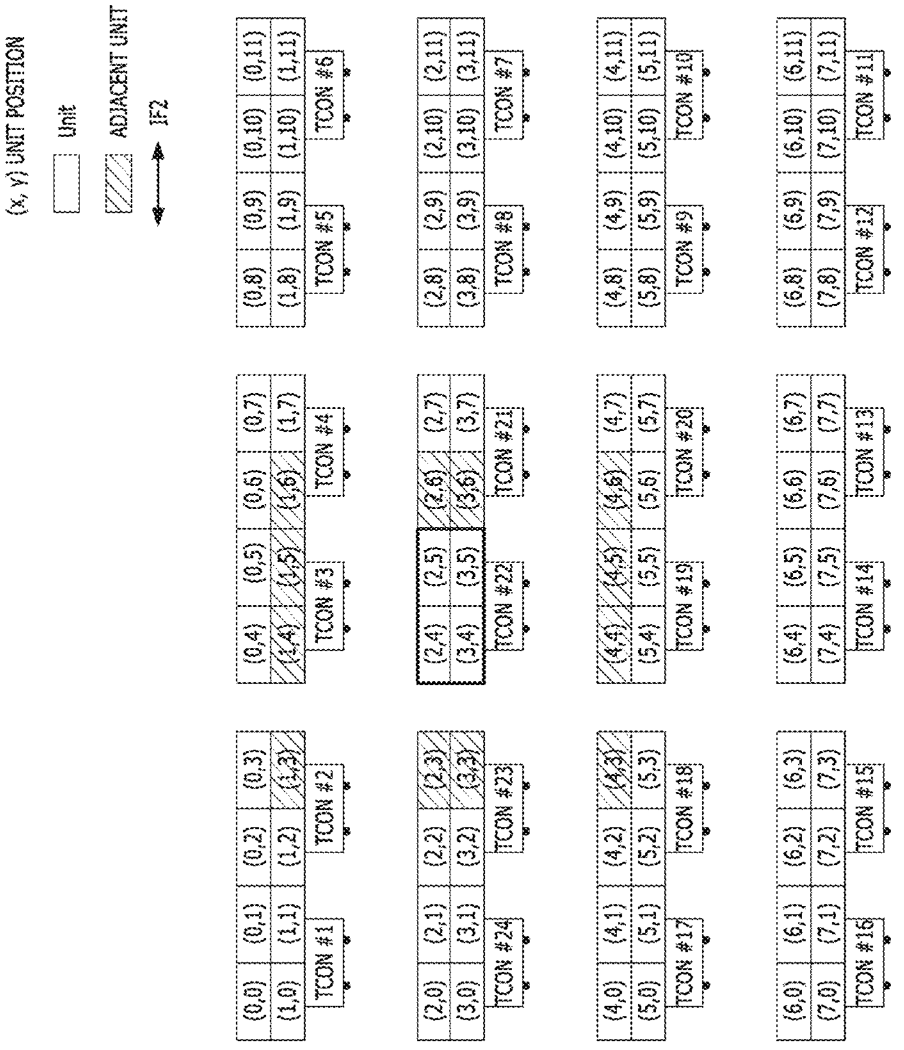
FIG. 12 is a diagram for describing a boundary processing operation of a last display module based on pieces of APL information about adjacent units according to the one embodiment.
Figure 13:
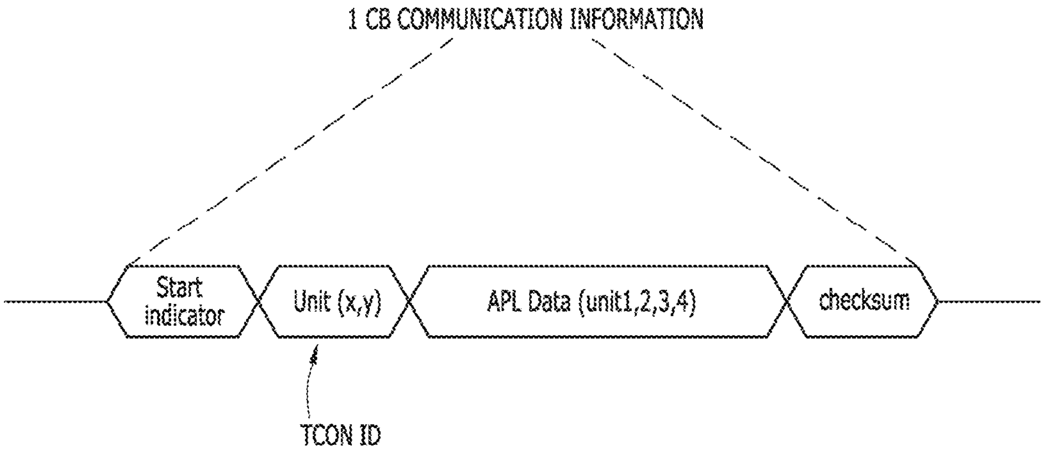
FIG. 13 is a diagram illustrating an APL communication protocol with respect to one display module according to the one embodiment.

FIG. 11 is a diagram illustrating an interface connection structure between timing controllers for transferring and receiving pieces of average picture level (APL) information. FIG. 12 is a diagram for describing a boundary processing operation of a $21^{th}$ display module (e.g., a last display module) based on pieces of APL information about adjacent units. FIG. 13 is a diagram illustrating an APL communication protocol with respect to one display module.

Referring to FIGS. 11 and 12, adjacent Nos. timing controllers of timing controllers TCON #1 to TCON #24 may be connected with each other through a second-type interface circuit IF2 and may transfer and receive pieces of APL information therebetween. Whenever APL information is received from an adjacent No. timing controller of one side, each of the timing controllers TCON #1 to TCON #24 may transfer the received APL information to an adjacent No. timing controller of the other side. In this manner, each of the timing controllers TCON #1 to TCON #24 may share all APL information about the other timing controllers. Each of the timing controllers TCON #1 to TCON #24 may further refer to pieces of APL information of display units adjacent to a display module including a corresponding timing controller among all APL information about the other timing controllers in calculating an APL thereof, and thus, may remove a boundary luminance deviation with adjacent display units.

For example, in FIG. 12, the timing controller TCON #22 may calculate APL information thereof with further reference to pieces of APL information about twelve adjacent display units (oblique-line illustration). In FIG. 12, a second-type interface circuit IF2 connecting the timing controllers TCON #1 to TCON #24 with one another is omitted. The timing controllers TCON #1 to TCON #24 of FIG. 12 may have the same interfacing connection structure as FIG. 11. In FIG. 12, (x,y) represents a position of a display unit.

APL information calculated in each of the timing controllers TCON #1 to TCON #24 may be transferred to the other timing controllers through a communication protocol as in FIG. 13. APL communication information may include start indication information, coordinate information about a display unit including TCON ID, APL data of four display units, and checksum information. The start indication information may be APL sharing start timing information which is changed based on the degree of input delay of an input data enable signal. The start indication information may include the input delay information Z1, Z2, Z3, Z4, . . . of FIG. 10.

Figure 14:
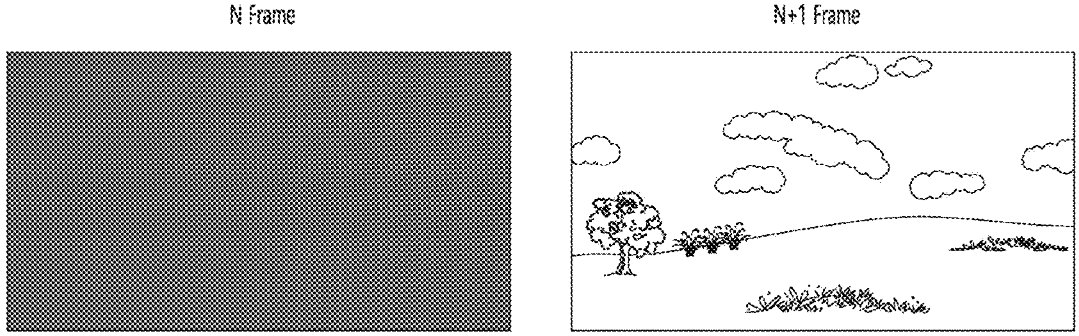
FIG. 14 is a diagram illustrating an example where an input image is changed in two adjacent frames according to the one embodiment.
Figure 15A:
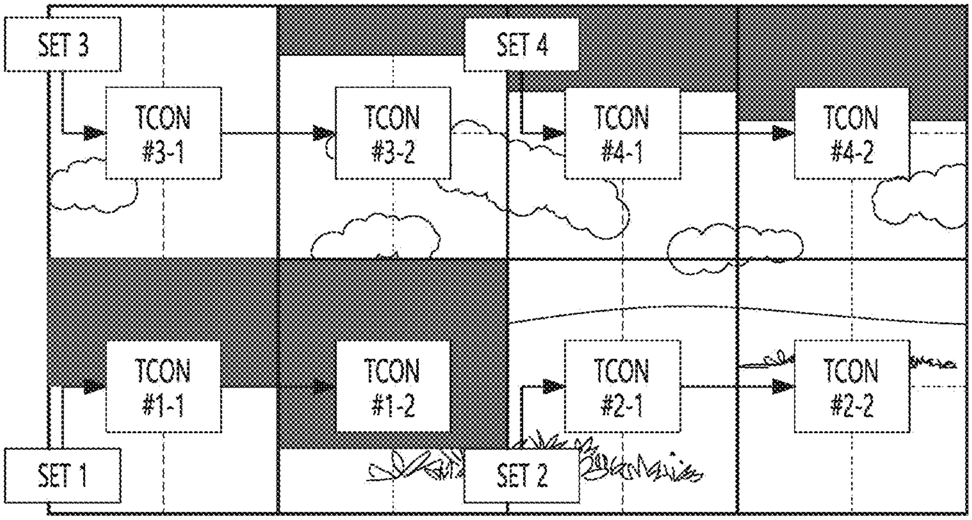
FIG. 15A is a diagram illustrating an example of an image quality defect occurring a tiling screen due to output non-synchronization between display modules.
Figure 15B:
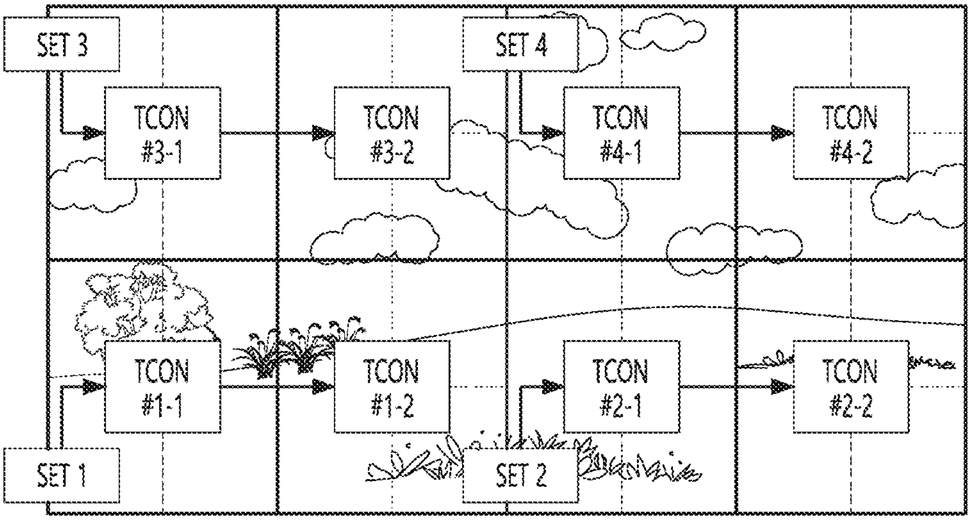
FIG. 15B is a diagram illustrating an example where a normal output image is displayed on a tiling screen, based on output synchronization between display modules according to the one embodiment.

FIG. 14 is a diagram illustrating an example where an input image is changed in two adjacent frames. FIG. 15A is a diagram illustrating an example of an image quality defect occurring a tiling screen due to output non-synchronization between display modules. FIG. 15B is a diagram illustrating an example where a normal output image is displayed on a tiling screen, based on output synchronization between display modules.

As in FIG. 14, in a case where an input image to be displayed on a tiling screen is rapidly changed in an $N^{th}$ frame and an $N+1^{th}$ frame, when output times of input images between display modules match one another based on a synchronized output data enable signal (see FIG. 15B), an image quality defect of a tiling screen may be far more reduced than when a mismatch therebetween (see FIG. 15A).

The present embodiment may realize the following effect.

The present embodiment may automatically synchronize image output times between all display modules configuring a tiling screen, and thus, may considerably improve the image quality of the tiling screen.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A tiling display apparatus comprising:

a first display group including first timing controllers configured to receive a first input data enable signal that is synchronized with a first input image from a first system chip, the first input data enable signal having a first delay; and a second display group including second timing controllers configured to receive a second input data enable signal that is synchronized with a second input image from a second system chip, the second input data enable signal having a second delay that is different from the first delay, wherein the first timing controllers of the first display group and the second timing controllers of the second display group share input delay information about the first delay of the first input data enable signal and input delay information about the second delay of the second input data enable signal with each other, and each of the first timing controllers and the second timing controllers generate a common output data enable signal based on the input delay information about the first delay and the input delay information about the second delay, and wherein an output timing of the first input image to display the first input image matches an output timing of the second input image to display the second input image based on the common output data enable signal generated by each of the first timing controllers and the second timing controllers.

2. The tiling display apparatus of claim 1, wherein the first timing controllers of the first display group and the second timing controllers of the second display group determine which of the first input data enable signal and the second input data enable signal has a longest amount of delay based on the input delay information about the first delay of the first input data enable signal and the input delay information about the second delay of the second input data enable signal, and each of the first timing controllers and the second timing controllers generates the common output data enable signal with respect to the determined input data enable signal having the longest amount of delay.

3. The tiling display apparatus of claim 1, wherein the first timing controllers of the first display group synchronize common output data enable signals generated by the first timing controllers with a timing at which the first input image is output to a tiling screen included in the first display group, and the second timing controllers of the second display group synchronize common output data enable signals generated by the second timing controllers with a timing at which the second input image is output to a tiling screen included in the second display group.

4. The tiling display apparatus of claim 1, further comprising:

a first type of interface circuit configured to connect together the first timing controllers of the first display group and connect together the second timing controllers of the second display group, wherein the first timing controllers of the first display group are configured to sequentially receive the first input data enable signal that is synchronized with the first input image via the first type of interface circuit and the second timing controllers of the second display group are configured to sequentially receive the second input data enable signal synchronized with the second input image via the first type of interface circuit, and wherein one of the first timing controllers of the first display group is connected with the first system chip via the first type of interface circuit, and one of the second timing controllers of the second display group is connected with the second system chip via the first type of interface circuit.

5. The tiling display apparatus of claim 4, further comprising:

a second type of interface circuit that is different from the first type of interface circuit, wherein the first timing controllers of the first display group and the second timing controllers of the second display group are connected with each other via the second type of interface circuit and share the input delay information about the first delay and the input delay information about the second delay with each other via the second type of interface circuit, and wherein one of the first timing controllers of the first group is connected with one of the second timing controllers of the second group via the second type of interface circuit.

6. The tiling display apparatus of claim 5, wherein each of the first display group and the second display group comprises a plurality of displays, and the first timing controllers of the first display group share first average picture level information of the first input image for display by the plurality of display included in the first display group with the second timing controllers of the second display group via the second type of interface circuit, and the second timing controllers of the second display group share second average picture level information about the second input image for display by the plurality of displays included in the second display group with the first timing controllers of the first display group via the second type of interface circuit.

7. The tiling display apparatus of claim 6, wherein the first timing controllers of the first display group and the second timing controllers of the second group share the input delay information about the first delay and the input delay information about the second delay based on the first average picture level information and the second average picture level information.

8. The tiling display apparatus of claim 7, wherein the first average picture level information comprises first timing information indicative of when to start sharing the first average picture level information based on the first delay of the first input data enable signal, and the second average picture level information comprises second timing information indicative of when to start sharing the second average picture level information based on the second delay of the second input data enable signal.

9. A tiling display device comprising:

a plurality of system chips configured to output a plurality of input data enable signals having different delays, each of the plurality of input data enable signals synchronized with a corresponding portion of an input image; and a plurality of display groups that are each configured to receive a corresponding input data enable signal from the plurality of input data enable signals and display a corresponding portion of the input image, each of the plurality of display groups including a plurality of timing controllers that are each configured to:

receive delay information indicative of different delays of the plurality of input data enable signals from one or more other timing controllers from the plurality of timing controllers;

determine a longest delay of the different delays from the received delay information; and generate a corresponding output data enable signal based on the longest delay, the corresponding output data enable signal indicative of when the display group displays the corresponding portion of the input image, wherein output data enable signals generated by the plurality of timing controllers have a same timing at which each of the plurality of display groups displays the corresponding portion of the image.

10. The tiling display device of claim 9, wherein each of the plurality of timing controllers is further configured to:

receive, from one system chip from the plurality of system chips, a corresponding input data enable signal from the plurality of input data enable signals that is synchronized with the portion of the input image, the corresponding input data enable signal having a delay.

11. The tiling display device of claim 10, further comprising:

a first type of interface circuit configured to connect together the plurality of timing controllers included each of the plurality of display groups, and one of the plurality of timing controllers included in each of the plurality of display groups is connected with a corresponding one of the plurality of system chips via the first type of interface circuit, wherein the plurality of timing controllers included in each of the plurality of display groups are configured to sequentially propagate the corresponding input data enable signal received from the one of the plurality of system chips amongst the plurality of timing controllers in the display group via the first interface circuit; and a second type of interface circuit that is different from the first type of interface circuit, wherein the plurality of timing controllers across all of the plurality of display groups are connected with each other via the second type of interface circuit and share the delay information indicative of different delays of the plurality of input data enable signals with each other via the second type of interface circuit.

12. The tiling display device of claim 11, wherein the plurality of display groups are arranged into a plurality of rows of display groups, and a timing controller included in a first display group positioned in a first row of the plurality of rows of display groups receives delay information indicative of a delay of an input data enable signal received by a second display group positioned in a last row of the plurality of rows of display groups from a timing controller included in a third display group that is located in the first row via the second type of interface circuit.

13. The tiling display device of claim 11, wherein the first type of interface circuit is configured for unidirectional communication and the second type of interface circuit is configured for bidirectional communication.

14. The tiling display device of claim 9, wherein the plurality of timing controllers included in each of the plurality of display groups are further configured to:

calculate average picture level information of the corresponding portion of the input image configured to be displayed by the display group; and receive average picture level information of other portions of the input image from the one or more other timing controllers included in at least one other display group from the plurality of display groups.

15. A tiling display device comprising:

a plurality of system chips configured to output a plurality of input data enable signals having different delays, each of the plurality of input data enable signals synchronized with a corresponding portion of an input image;

a plurality of display groups arranged in a plurality of rows of display groups, each display group including a plurality of timing controllers;

a plurality of first interfaces configured to receive the plurality of input data enable signals, each first interface configured to connect together the plurality of timing controllers included in a corresponding display group from the plurality of display groups and connect one timing controller from the plurality of timing controllers included in the corresponding display group to a corresponding one of the plurality of system chips; and a second interface configured to connect together the plurality of timing controllers across all of the plurality of display groups.

16. The tiling display device of claim 15, wherein the plurality of first interfaces are configured for unidirectional communication and the second interface is configured for bidirectional communication.

17. The tiling display device of claim 16, wherein each of the plurality of display groups is configured to receive a corresponding input data enable signal from the plurality of input data enable signals from the corresponding one of the plurality of system chips via the first interface that is connected to the one timing controller included in the display group.

18. The tiling display device of claim 17, wherein each of the plurality of timing controllers across all of the plurality of display groups is configured to share delay information associated with the corresponding input data enable signal received by the display group that includes the timing controller with all remaining timing controllers across the plurality of display groups via the second interface.

19. The tiling display device of claim 18, wherein each of the plurality of timing controllers across all of the plurality of display groups is configured to determine a longest delay amongst the plurality of input data enable signals based on the shared delay information and generate a corresponding output data enable signal based on the longest delay that is indicative of when the display group that includes the timing controller displays the corresponding portion of the input image, wherein output data enable signals generated by the plurality of timing controllers have a same timing at which each of the plurality of display groups displays the corresponding portion of the image.

* * * * *